United States Patent [19]

Coates

[11] 4,233,839

[45] Nov. 18, 1980

[54] APPARATUS AND METHOD FOR DETERMINING CHARACTERISTICS OF SUBSURFACE FORMATIONS

[75] Inventor: George R. Coates, Houston, Tex.

[73] Assignee: Schlumberger Technology Corporation, New York, N.Y.

[21] Appl. No.: 3,186

[22] Filed: Jan. 15, 1979

Related U.S. Application Data

[63] Continuation-in-part of Ser. No. 842,005, Oct. 7, 1977, abandoned.

[51] Int. Cl.$^3$ ............................................. E21B 49/00
[52] U.S. Cl. ...................................................... 73/152
[58] Field of Search ........................ 73/152, 151; 324/1

[56] References Cited

U.S. PATENT DOCUMENTS

| | | |
|---|---|---|
| 2,689,329 | 9/1954 | Zimmerman . |
| 3,778,706 | 12/1973 | Thompson ........................ 324/61 R |
| 3,895,289 | 7/1975 | Rickey et al. ............................ 324/1 |
| 4,015,195 | 3/1977 | Hoyer et al. .............................. 324/1 |

OTHER PUBLICATIONS

*Porosity—resistivity Cross—plots Can Help to Evaluate Formations,* William H. Lang, Jr., The Oil and Gas Journal, Nov. 29, 1976.
*Dielectric Constant of Rocks As A Petrophysical Parameter,* W. A. Hoyer et al., SPWLA Seventeenth Annual Logging Symposium, Jun. 9–12, 1976.
*Low Porosity Gas Sand Analysis Using Cation Exchange and Dielectric Constant Data,* J. W. Kern et al., SPWLA Seventeenth Annual Logging Symposium, Jun. 9–12, 1976.
*Electrical Conductivities in Shaly Sands,* Monroe H. Waxman et al., Society of Petroleum Engineers of AIME, 1972.
*Electrical Conductivites in Shaly Sands,* Monroe H. Waxman et al., Journal of Petroleum Technology, Feb., 1974.
*Electrical Conductivities in Oil—Bearing Shaly Sands,* Monroe Waxman et al., Society of Petroleum Engineers Journal, Jun., 1968.

*Primary Examiner*—Anthony V. Ciarlante
*Attorney, Agent, or Firm*—Martin M. Novack; Kenneth Olsen; Henry N. Garrana

[57] ABSTRACT

The determination of a "composite" parameter of the formation water in formations surrounding a borehole, for example the composite conductivity of the formation water, is used in the disclosure to obtain a relatively accurate determination of formation characteristics, such as water saturation. The determined values are meaningful even in shaly regions of the formations. In contrast to past approaches which attempted to determine the volume and distribution type of shale or clay present in the formations and then introduce appropriate factors which often involve substantial guesswork, the disclosed technique determines a composite water parameter, for example a composite water conductivity, which represents the conductivity of the bulk water in the formations, including both free water and bound water. Bound water trapped in shales is accounted for in this determination so unlike prior techniques, the shales can be considered as having a porosity. Having determined the composite water conductivity, water saturation can be directly obtained using relatively straightforward relationships which do not require estimates of the volume of shale in the formations. Shale effects are accounted for by the different conductivities (or other parameter such as capture cross sections) of the formation water constituents (free and bound) which make up the total water.

62 Claims, 14 Drawing Figures

APPARATUS AND METHOD FOR DETERMINING CHARACTERISTICS OF SUBSURFACE FORMATIONS

BACKGROUND OF THE INVENTION

This is a continuation-in-part of U.S. application Ser. No. 842,005 which was filed on Oct. 7, 1977 now abandoned.

This invention relates to an apparatus and method for investigating subsurface formations and, more particularly, to an apparatus and method for determining a composite parameter of the formation water in formations surrounding a borehole, for example the composite conductivity of the formation water. Using the composite parameter, other useful information, for example a determination of water saturation, can be accurately made, even in shaly formations.

The amount of oil or gas contained in a unit volume of a subsurface reservoir is a product of its porosity and its hydrocarbon saturation. The total porosity of a formation, designated $\phi_t$, is the fraction of the formation unit volume occupied by pore spaces. Hydrocarbon saturation, designated $S_h$, is the fraction of the pore volume filled with hydrocarbons. In addition to the porosity and hydrocarbon saturation, two other factors are necessary to determine whether a reservoir has commercial potential; viz., the volume of the reservoir and its producibility. In evaluating producibility, it is important to know how easily fluid can flow through the pore system. This depends upon the manner in which the pores are interconnected and is a property known as permeability.

To determine the amount of producible hydrocarbons in a formation, it is useful to obtain a measure of the bulk volume fraction of hydrocarbons displaced in invasion of the drilling mud during the drilling operation. During drilling, the mud in the borehole is usually conditioned so that the hydrostatic pressure of the mud column is greater than the pore pressure of the formations. The differential pressure forces mud filtrate into the permeable formations. Very close to the borehole, virtually all of the formation water and some of the formation hydrocarbons, if present, are flushed away by the mud filtrate. This region is known as the "flushed zone". The bulk volume fraction of hydrocarbons displaced by invasion in the flushed zone is an indication of the amount of "movable" hydrocarbons in the particular portion of the formations. This bulk volume fraction of the hydrocarbons displaced by invasion can be expressed as $\phi_t(S_h - S_{hr})$, where $S_{hr}$ is the residual hydrocarbon saturation in the flushed zone (i.e., the saturation of hydrocarbons which were not flushed away by the mud filtrate and generally considered as immovable). The saturation of the mud filtrate, designated as $S_{xo}$, can be represented as $$S_{xo} = (1 - S_{hr}) \quad (1)$$

The saturation of hydrocarbons in the uninvaded formations, designated $S_h$, can be expressed as $$S_h = (1 - S_w) \quad (2)$$

where $S_w$ is the water saturation of the formations; i.e., the fraction of the pore spaces filled with water. From the equations (1) and (2), it can be seen that the previously set forth expression for the bulk volume fraction of oil displaced by invasion, $\phi_t(S_h - S_{hr})$, can be expressed as $$\phi_t(S_h - S_{hr}) = \phi_t(S_{xo} - S_w) \quad (3)$$

Generally, relatively accurate determinations of $\phi_t$ can be obtained using known logging techniques, so accurate determinations of $S_{xo}$ and $S_w$ are highly useful, inter alia, for determining the bulk volume fraction of hydrocarbons displaced by invasion and, therefore, the fraction of producible hydrocarbons for particular formations surrounding the borehole.

Classical prior art techniques exist for determining water saturation and/or related parameters. It has been established that the resistivity of a clean formation (i.e., one containing no appreciable amount of clay), fully saturated with water, is proportional to the resistivity of the water. The constant of proportionality, designated F, is called the formation factor. Thus we have $$F = R_o/R_w \quad (4)$$

where $R_o$ is the resistivity of the formation 100% saturated with water of resistivity $R_w$. Formation factor is a function of porosity, and can be expressed as $$F = a/\phi_t^m \quad (5)$$

where a and m are generally taken to be 1 and 2, respectively. Using these values, the true resistivity, designated $R_t$, of a clean formation containing hydrocarbons is expressed as $$R_t = R_w/S_w^n \phi_t^2 \quad (6)$$

where n, the saturation exponent, is generally taken to be 2. Using the classical equation set forth, one conventional prior art technique computes a value, designated $R_o'$ which is a computed "wet" resistivity value and assumes that the formation is fully saturated with water; i.e., $S_w = 1$. From relationship (6), it can be seen that $$R_o' = R_w/\phi_t^2 \quad (7)$$

In this computation, $\phi_t$ may be obtained from logging information, for example from neutron and/or density log readings, and $R_w$ may be obtained from local knowledge of connate water resistivity or, for example, from a clean water-bearing section of a resistivity log. The computed value of $R_o'$ is compared with a measured value of resistivity, designated $R_t$, obtained, for example, from a deep investigation resistivity or induction log. In clean zones having no hydrocarbons $R_o'$ will track $R_t$, but when $R_o'$ is less than $R_t$, there is an indication of the presence of hydrocarbons. Thus, by overlying the computed wet resistivity ($R_o'$) and the measured resistivity ($R_t$), potential hydrocarbon bearing zones can be identified. From equations (6) and (7), it is seen that another way of using this information is to obtain a computed value of apparent water saturation, designated $S_w'$, from the relationship $$S_w' = \sqrt{\frac{R_o'}{R_t}} \quad (8)$$

Substantial deviations of $S_w'$ from unity also indicate potential hydrocarbon bearing zones.

The described types of techniques are effective in relatively clean formations, but in shaly formations the shales contribute to the conductivity, and the usual resistivity relationships, as set forth, do not apply. Accordingly, and for example, the previously described overlay or $R_o'$ and $R_t$ can lead to incorrect conclusions in a shale section of the formations, and the overlay in these sections (as well as the determination of water saturation taken therefrom) is generally, of necessity, ignored. In addition to the results being less useful than they might be, this consequence can tend to diminish the credibility of the entire computed log comparison and is a disadvantage when attempting to commercially exploit the resultant information. Accurate determination of $S_w$ can also be difficult in shaly sections. Of course, these are just limited examples of how shaliness can interfere with measurement interpretation, but similar problems with shaliness arise in other situations, such as when invaded zone characteristics (like $S_{xo}$) are to be determined or when interrupting readings from thermal decay time logs in cased boreholes.

A number of techniques, of varying complexity, are in existence for aiding in the interpretation of results obtained in shaly formations. The manner in which shaliness affects a log reading depends on the proportion of shale and its physical properties. It may also depend upon the way the shale is distributed in the formations. It is generally believed that the shaly material is distributed in shaly sands in three possible ways; i.e., "laminar shale" where the shale exists in the form of laminae between which are layers of sand, "structural shale" where the shale exists as grains or nodules in the formation matrix, and "dispersed shale" where the shaly material is dispersed throughout the sand partially filling the intergranular interstices. Shaly-sand evaluations are typically made by assuming a particular type of shale distribution model and incorporating into the model information which indicates the volume of shale or the like. For example, in a laminated sand-shale simplified model, an equation of the form of equation (6) is set forth, but includes a second term which is a function of the bulk-volume fraction of shale in the laminae. The same is true for another known model wherein a term is developed which depends upon the volume fraction of shale as determined from a total clay indicator. In a dispersed shale simplified model, values are developed for an "intermatrix porosity" which includes all the space occupied by fluids and dispersed shale and another value is developed representing the fraction of that porosity occupied by the shale. Still another approach relates the conductivity contribution of the shale to its cation exchange capacity, this capacity being determined, inter alia, from the volume of clay.

The described prior art techniques, which require either a determination of the volume of shale or clay, or similar information, have been satisfactory in some applications. However, in addition to the difficulty of accurately obtaining information concerning the volume and composition of shale or clay and its conductivity, a further problem with prior art simplified models is that various forms of shale may occur simultaneously in the same formation. Reliable techniques, some of which use extensive statistical treatment of data, do exist and generally yield good results, but tend to be relatively complex and may require either powerful computing equipment and/or substantial processing time.

It is one object of the present invention to provide a solution to the indicated prior art problems and to set forth techniques which are effective even in shaly formations, but which are not unduly complex or difficult to implement.

SUMMARY OF THE INVENTION

Applicant has discovered that determination of a "composite" parameter of the formation water in formations surrounding a borehole, for example the composite conductivity of the formation water, allows a relatively accurate determination of formation characteristics, such as water saturation, the determined values being meaningful even in shaly regions of the formations. In contrast to past approaches which attempted to determine the volume of shale or clay present in the formations and then introduce appropriate factors which often involve substantial guesswork, applicants' technique determines a composite water parameter, for example a composite water conductivity, which represents the conductivity of the bulk water in the formations, including both free water and bound water. Bound water trapped in shales is accounted for in this determination, so unlike prior techniques, the shales can be considered as having a porosity. Having determined, at each depth level, the composite water conductivity, water saturation can be directly obtained using relatively straightforward relationships which do not require estimates of the volume of shale in the formations. Shale effects are accounted for in the present invention by the different conductivities (or other parameter such as capture cross sections) of the formation water constituents (free and bound) which make up the total water. As used herein, "free water" is generally intended to mean water that is reasonably free to be moved under normal reservoir dynamics, whereas "bound water" is generally intended to mean water that is not reasonably free to be moved under normal reservoir dynamics.

In accordance with an embodiment of the invention, there is provided an apparatus for determining, at each depth level, a composite parameter (such as the composite conductivity or the composite capture cross section) of the formation water in formations surrounding a borehole. Means are provided for deriving a first quantity representative of the parameter attributable to the free water in the formations. Means are also provided for deriving a second quantity representative of the fraction of bound water in the formations. (As will become clear, the second quantity could alternatively be obtained indirectly from the fraction of free water). Further means are provided for deriving a third quantity representative of the parameter attributable to the bound water in the formations. The composite parameter is then determined as a function of the first, second and third quantities.

In one form of the invention, a fourth quantity is derived, as the difference between the third and first quantities. The composite parameter is then determined as the sum of the first quantity and the product of the second and fourth quantites.

In an embodiment of the present invention the composite water conductivity, designated $\sigma_{wc}'$, is expressed by the following relationship:

$$\sigma_{wc}' = \sigma_{wf} + \frac{S_{wb}}{S_w}(\sigma_{wb} - \sigma_{wf}) \qquad (9)$$

where $\sigma_{wf}$ is the conductivity of the free water in the formations, $\sigma_{wb}$ is the conductivity of the bound water in the formations, $S_w$ is the water saturation of the formations (which equals $\phi_w/\phi_t$), and $S_{wb}$ is the saturation of the bound water in the formations (which equals $\phi_{wb}/\phi_t$). The expression (9) apportions the composite water conductivity as between the conductivity of the free water (the above-indicated first quantity) and the conductivity of a difference term which expresses the difference between the conductivities of the bound water and the free water (the above-indicated fourth quantity). Mathematical manipulation shows that another form of expression (9) is $$\sigma_{wc}' = \frac{(S_w - S_{wb})}{S_w} \sigma_{wf} + \frac{S_{wb}}{S_w} \sigma_{wb} \quad (10)$$

In this form, the composite water conductivity can be viewed as the sum of a first term, which represents the fraction of free water times the conductivity of the free water, plus a second term which represents the fraction of bound water times the conductivity of the bound water. As implied above, the fraction of free water, $S_{wf}/S_w$, (which is the unity complement of the bound water fraction—since the total water volume consists of the free water volume plus the bound water volume) could alternately be used in expressions (9) or (10). For example, the form of expression (10) would then be $$\sigma_{wc}' = \frac{S_{wf}}{S_w} \sigma_{wf} + \frac{(S_w - S_{wf})}{S_w} \sigma_{wb} \quad (10a)$$

which can be seen to be equivalent to (10) since $S_w = S_{wf} + S_{wb}$. Accordingly, when the term "fraction of bound water", or the like, is used in this context, it will be understood that its complement (the fraction of free water) could alternatively be employed in appropriate form.

In another embodiment of the invention, the composite parameter of the formation water is the composite water capture cross section, designated $\Sigma_{wc}'$. As is shown in the art, capture cross section is a measure of the fraction of thermal neutrons absorbed per unit time, and is typically measured using a thermal neutron decay time ("NDT") logging device of the type described, for example, in U.S. Pat. No. RE 28,477. The composite water capture cross section, $\Sigma_{wc}'$, is expressed herein as $$\Sigma_{wc}' = \Sigma_{wf} + \frac{S_{wb}}{S_w} (\Sigma_{wb} - \Sigma_{wf}) \quad (11)$$

which is similar to expression (9), but where $\Sigma_{wf}$ is the capture cross section of the free water in the formations and $\Sigma_{wb}$ is the capture cross section of the bound water in the formations.

In accordance with a further feature of the invention, a value of water saturation is generated and provides meaningful information even in shaly regions. This obviates the prior art technique of estimating an appropriate "cementation" exponent for shaly formations.

In accordance with still further features of the invention, relationships similar to (9) or (10) can be set forth in terms of a generalized parameter, "P", and utilized to obtain a free, a bound, or a composite water parameter, depending on what information is desired and what information is measurable or deriveable. In particular, if it is desired to obtain a parameter of the free water, one can set forth the following generalized relationship which is similar in form to relationship (9) above $$P_{wc} = P_{wf}' + \frac{S_{wb}}{S_w} (P_{wb} - P_{wf}') \quad (9a)$$

where $P_{wc}$ is a composite water parameter, $P_{wb}$ is a bound water parameter, and $P_{wf}'$ is the free water parameter to be determined. In an embodiment of the invention, the free water parameter to be determined is in the form of a variable $\phi_w \alpha_{wf}$, defined as the signal attenuation attributable to formations when assuming that substantially all of the water therein is free water. Means are provided for deriving a function representative of the parameter (attenuation in this case) in at least one region of the formations (typically a clean sand region) in which substantially all of the water present is free water. Means are also provided for deriving a quantity representative of water content in the formations surrounding a particular depth location in the borehole. This quantity may be $t_{pl}$, the travel time of microwave electromagnetic energy in the formations, which is dependent on water content. The free water parameter (in the form of the variable $\phi_w \alpha_{wf}$ in this case) at the particular depth level is then determined from the derived function and the water content representative quantity. Measurements of attenuation and travel time are typically obtained using an "EMP" microwave electromagnetic propagation logging device.

In terms of the attenuation, $\alpha$, the relationship (9a) can be expressed as $$\alpha_{wc} = \alpha_{wf} + \frac{S_{wb}}{S_w} (\alpha_{wb} - \alpha_{wf}) \quad (9b)$$

where $\alpha_{wb}$ is the bound water conterpart of $\alpha_{wf}$, and $\alpha_{wc}$ is a "composite" attenuation for the actual formation water.

As will be described further hereinbelow, the "apportionment" of attenuation, as between the free end bound water which is indicated by expression (9b) leads to a technique for determining the fraction of bound water, $S_{wb}/S_w$ once the values of $\alpha$, $\alpha_{wf}$ and $\alpha_{wb}$ have been established. In particular, $S_{wb}/S_w$ can be determined from $$\frac{S_{wb}}{S_w} = \frac{\alpha_{wc} - \alpha_{wf}}{\alpha_{wb} - \alpha_{wf}} \quad (9c)$$

which follows directly from relationship (9b).

Further features and advantages of the invention will become more readily apparent from the following detailed description when taken in conjunction with the accompanying drawings.

BRIEF DESCRIPTION OF THE DRAWINGS

FIG. 3 is a block diagram of the computing module 70 of FIG. 1.

DESCRIPTION OF THE PREFERRED EMBODIMENT

Figure 1:
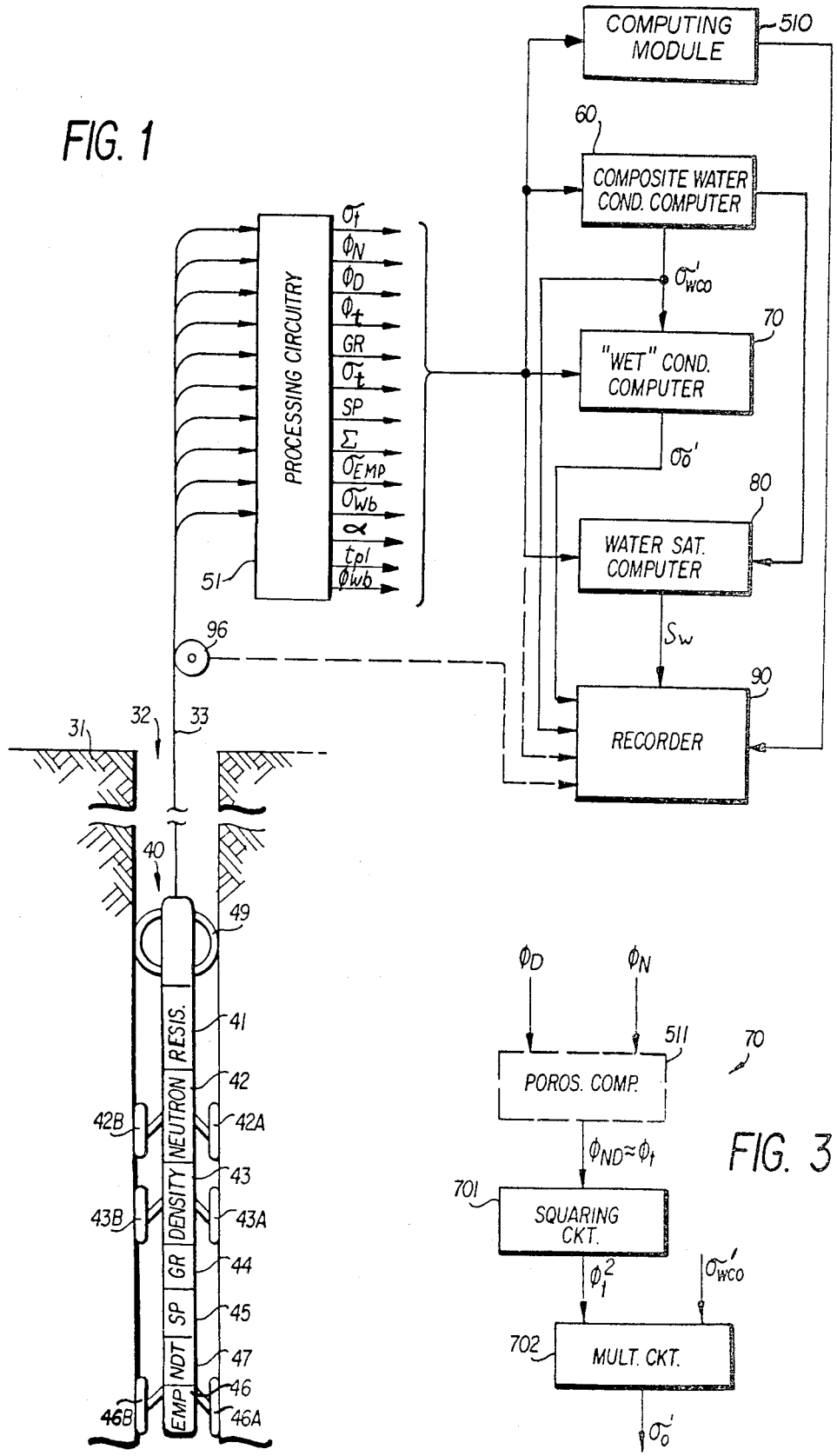
FIG. 1 is a simplified block diagram of an apparatus in accordance with an embodiment of the invention.

Referring to FIG. 1, there is shown a representative embodiment of an apparatus in accordance with the present invention for investigating subsurface formations 31 traversed by a borehole 32. The borehole 32 is typically filled with a drilling fluid or mud which contains finely divided solids in suspension. The investigating apparatus or logging device 40 is suspended in the borehole 32 on an armored cable 33, the length of which substantially determines the relative depth of the device 40. The cable length is controlled by suitable means at the surface such as a drum and winch mechanism (not shown). Circuitry 51, shown at the surface, although portions thereof may typically be downhole, represents the overall processing circuitry for the various logging units of apparatus 40.

The investigating apparatus 40 includes a suitable resistivity-determining device such as an induction logging device 41. As is shown in the art, formation resistivity or conductivity is indicated by the induction log readings, the measured conductivity being designated as $\sigma_t$. The downhole investigating apparatus also includes a sidewall epithermal neutron exploring device 42 having a source and detector mounted on a skid 42A. A device of this type is disclosed, for example, in U.S. Pat. No. 2,769,918. Each count registered in the epithermal neutron detector is received by a processing circuit in the overall circuitry 51 which includes a function former that operates in well known manner to produce a signal $\phi_N$ which represents the formation porosity as determined by the neutron logging device. The investigating apparatus 40 further includes a formation density exploring device 43 for producing well logging measurements which can be utilized to calculate the bulk density of the adjoining formations, in known manner. In this regard, a skid 43A houses a source and two detectors (not shown) spaced different differences from the source. This arrangement of source and detectors produces signals that correspond to the bulk density of the earth formations as is described, for example, in the U.S. Pat. No. 3,321,625. The circuitry 51 includes conventional circuits which convert the signals derived from the short and long spacing detectors to a computed bulk density. If desired, a caliper signal may also be applied in determining bulk density, as is known in the art. The resulting bulk density is applied to porosity computing circuitry within the block 51 which computes the porosity, as derived from the bulk density, in well known fashion. The derived porosity is designated as $\phi_D$. The investigating apparatus includes a still further device 44 which is a gamma ray logging device for measuring the natural radioactivity of the formations. The device 44, as known in the art, may typically include a detector, for example a gamma ray counter, which measures the gamma radiation originating in the formations adjacent the detector. An output of circuitry 51 is a signal designated "GR" which represents the gamma ray log reading. Further devices may be provided, as required in accordance with variations of the invention as described hereinbelow. For example, a device 45 is available for obtaining measurement of the spontaneous potential ("SP") of the formations. This device may be of the type disclosed in U.S. Pat. No. 3,453,530, this patent also disclosing deep and shallow resistivity devices. Also, an electromagnetic propagation tool ("EMP") 46 is available, and includes a pad member 46A that has transmitting and receiving antennas therein. Microwave electromagnetic energy is transmitted through the formations (typically the invaded zone) and formation characteristics are determined by measuring the attenuation and/or phase (or velocity) of received microwave energy. This type of logging tool is described in U.S. Pat. No. 3,944,910. Measurements indicative of attenuation, designated $\alpha$, and of travel time (which depends on velocity), designated $t_{pl}$, are available from this tool. Also, in the copending U.S. Patent application Ser. Nos. 806,983 and 788,393, assigned to the same assignee as the same present application, there are disclosed techniques for obtaining an "EMP"-derived conductivity measurement, designated $\sigma_{EMP}$, and for obtaining a measurement of bound water filled porosity, designated $\phi_{wb}$. Signals representative of these measurement values are illustrated as being available outputs of circuitry 51. An NDT device 47, for example of the type disclosed in U.S. Pat. No. RE 28,477, is also available and results in an output capture cross section value, $\Sigma$, from processing circuitry 51.

To keep the investigating apparatus 40 centered in the borehole, extendable wall-engaging members 42B, 43B and 46B may be provided opposite the members 42A, 43A and 46A. For centering the upper portion of the investigating apparatus, centralizers 49 may also be provided. As noted, a borehole caliper can be combined with the arms which extend the skids and supply a signal representative of borehole diameter to the circuitry 51.

While all of the measurements to be used in practising the invention are shown, for ease of explanation in this illustrative embodiment, as being derived from a single exploring device, it will be understood that these measurements could typically be derived from a plurality of exploring devices which are passed through the borehole at different times. In such case, the data from each run can be stored, such as on magnetic tape, for subsequent processing consistent with the principles of the invention. Also, the data may be derived from a remote location, such as by transmission therefrom.

One or more of the signal outputs of block 51 are illustrated in FIG. 1 as being available to computing modules 60, 70, 80 and 510. In the embodiment of FIG. 1, the computing module 60 generates a signal representative of an apparent composite water conductivity, designated $\sigma_{wco}'$, consistent with the relationship (9). The computing module 70 is responsive to the signal representative of $\sigma_{wco}'$, and to the signals from block 51 (in particular a porosity-indicative signal), to generate a "wet" conductivity signal, $\sigma_o'$. The computing module 80 generates a computed value of water saturation, $S_w'$, in accordance with a relationship to be set forth. The computing module 510 is utilized in the generation of free and bound water attenuation values and a signal representative of the bound water fraction. These signals, along with some or all of the outputs of circuitry 51, are recorded as a function of depth on recorder 90.

Figure 2:
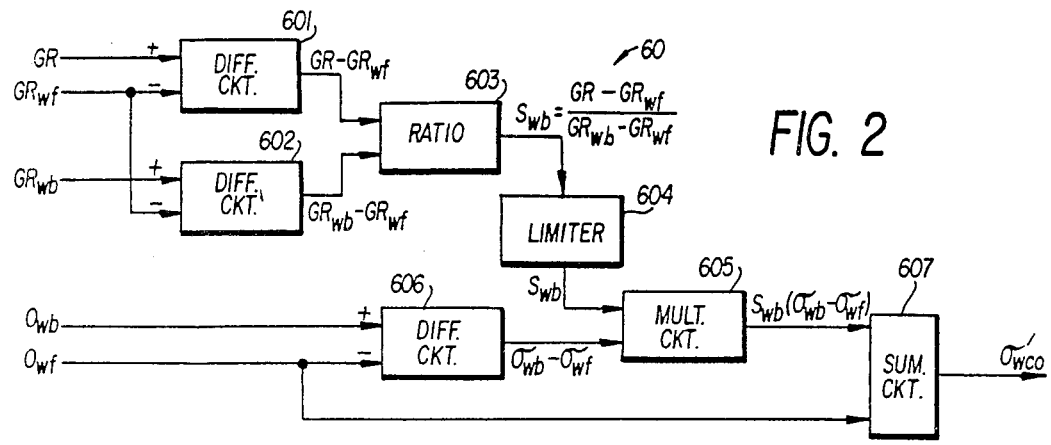
FIG. 2 is a block diagram of the computing module 60 of FIG. 1.

Referring to FIGS. 2 and 3, there are shown embodiments of the computing modules, 60 and 70 of FIG. 1. Initially, structural components of the modules will be described. The source of various signals, along with further rationale of the configurations, will then be set forth. A pair of difference circuits 601 and 602 are provided. The positive input terminal of circuit 601 receives the signal GR, i.e., a signal representative of the output of the gamma ray logging device 44. The positive input terminal of circuit 602 receives a signal designated $GR_{wb}$, which is a signal level representative of a gamma ray log level for the bound water of the formations being investigated. The negative input terminals of both difference circuits 601 and 602 receive a signal level designated $GR_{wf}$, which is a gamma ray log level for the free water in the formations being investigated. The outputs of circuit 601 and 602, which are respectively $GR-GR_{wf}$ and $GR_{wb}-GR_{wf}$, are coupled to a ratio circuit 603 which produces a signal proportional to the ratio of the output of circuit 601 divided by the output of circuit 602. The output of ratio circuit 603 is a signal representative of $S_{wb}$, i.e., the saturation of the bound water of the formations in accordance with the relationship $$S_{wb} = \frac{GR - GR_{wf}}{GR_{wb} - GR_{wf}} \qquad (12)$$

The output of ratio circuit 603 is coupled via limiter 604 to one input to a multiplier circuit 605. The other input to multiplier circuit 605 is the output of a difference circuit 606. The circuit 606 receives at its positive input terminal a signal level representative of $\sigma_{wb}$, i.e. the conductivity of the bound water in the formations being investigated. The negative input terminal of difference circuit 606 receives a signal level representative of $\sigma_{wf}$, i.e. the conductivity of the free water of the formations. This latter signal is also one input to a summing circuit 607 whose other input is the output of multiplier circuit 605. The output of summing circuit 607 is a signal representative of the apparent composite water conductivity of the formations being investigated, i.e.

$$\sigma_{wco}' = \sigma_{wf} + S_{wb}(\sigma_{wb} - \sigma_{wf}) \qquad (13)$$

This expression is seen to be the same as the expression (9) above for composite water conductivity, $\sigma_{wc}$, except that $S_w$ is assumed to be 1, which means that the result is an "apparent" composite water conductivity.

In FIG. 3 there is shown an implementation of the computing module 70 of FIG. 1 which is utilized to generate a signal representative of $\sigma_o'$, i.e. the computed "wet" conductivity of the investigated formations. The circuitry 51 (FIG. 1) includes a porosity computing circuit 511 which is responsive to the signals representative of $\phi_N$ and $\phi_D$. The circuit 511 uses this information, in well known manner, to produce a signal generally known as $\phi_{ND}$ that incorporates information from both the neutron and the density log readings to obtain an indication of formation total porosity, designated $\phi_t$. Techniques for obtaining $\phi_{ND}$ are well known in the art, and a suitable neutron-density porosity computing circuit is disclosed, for example, in the U.S. Pat. No. 3,590,228 of Burke. It will be understood however, that any suitable alternate technique for obtaining $\phi_t$ can be employed, including, for example, techniques that use other logging information, such as from a sonic log. The output of circuit 511 is coupled to a squaring circuit 701 whose outut is accordingly proportional to $\phi_t^2$. This signal is, in turn, coupled to one input terminal of a multiplier circuit 702, the other input to which is $\sigma_{wco}'$, i.e. the apparent composite water conductivity as determined by computing module 60 (FIG. 1, FIG. 2). Accordingly, the output of multiplier circuit 702 (which is also the output of computing module 70—FIG. 1), is a signal proportional to $\sigma_{wco}'$ multiplied by $\phi^2$, and is thus indicative of the computed "wet" conductivity of the formations, $\sigma_o'$, in accordance with a relationship analagous to (7) above; viz.:

$$\sigma_o' = \sigma_{wco}' \phi_t^2 \qquad (14)$$

The manner in which the inputs to computing module 60 can be developed will now be described. In particular, one preferred technique for obtaining values of $S_{wb}$, $\sigma_{wb}$ and $\sigma_{wf}$ is as follows: Log values of $\sigma_t$, GR and $\phi_t$ are initially obtained over a depth range of interest. Using the measured conductivity, $\sigma_t$ (which is preferably from a deep resistivity measurement), one can compute, at each depth level over the range of interest, a value designated $\sigma_{wa}'$ as $$\sigma_{wa}' = \sigma_t / \phi_t^2 \qquad (15)$$

Figure 5:
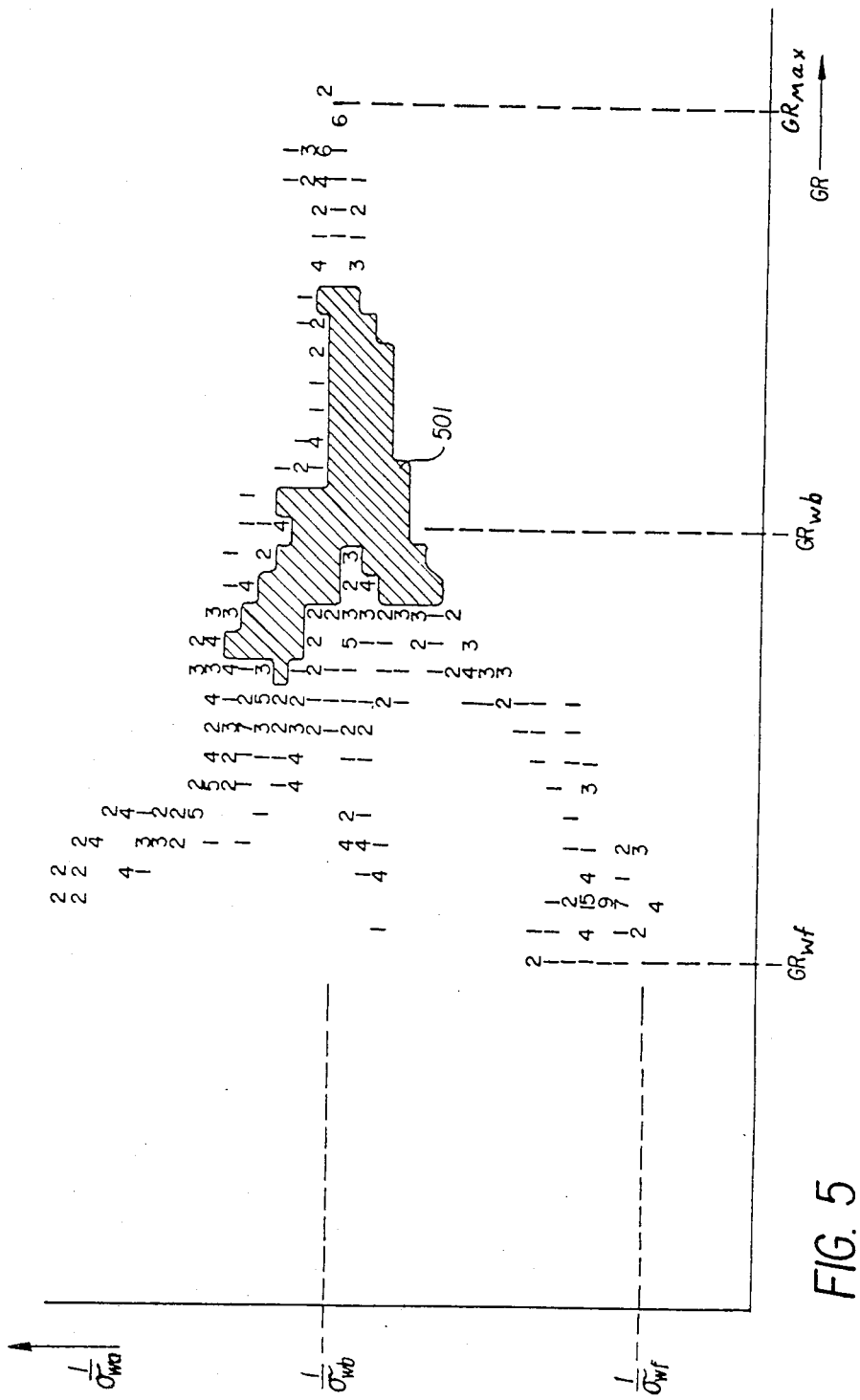
FIG. 5 is a frequency cross-plot useful in obtaining subsurface characteristic values that can be utilized in the present invention.

This is similar in form to relationship (7) above, and it is seen that $\sigma_{wa}'$ is a simple computed apparent water conductivity [not to be confused with the apparent composite water conductivity, $\sigma_{wco}'$, developed in accordance with relationship (13)]; that is, it is the computed value of water conductivity that would be expected in order for the obtained conductivity measurement ($\sigma_t$) to result from the obtained total porosity measurement, assuming that the total porosity is water-filled (viz. assuming that $S_w=1$). Stated another way, a formation of porosity $\phi_t$ which is filled with water of conductivity $\phi_{wa}'$ would (according to the basic Archie relationship) result in the measured formation conductivity $\sigma_t$. If desired, a computing circuit of the type employed in FIG. 3 (which uses another form of the relationship to develop $\sigma_o'$ from $\sigma_{wco}'$) could be utilized to obtain $\sigma_{wa}'$ in accordance with relationship (15), except that a divider is used instead of a multiplier. The inputs to the divider are $\sigma_t$ and $\sigma_t^2$. Having obtained $\sigma_{wa}'$ at each depth level over the depth range of interest, the inverse of these values can now be utilized, in conjunction with gamma ray (GR) log readings taken over the same depth range, to generate a frequency cross-plot of the type illustrated in FIG. 5. Frequency cross-plots are commonly used in the well logging art (see, for example, Schlumberger "Log Interpretation-Volume II", 1974 Edition). At each depth level, the values of $1/\sigma_{wa}'$ and GR result in a point on the cross-plot. When all points have been plotted, the number of points which fall within each small elemental area (of a selected size) on the plot are summed and presented numerically. The resultant plot is as shown in FIG. 5, with the numbers thereon representative of the frequency of occurrence of points at each particular elemental area on the plot. In the illustrated example, the region designated by enclosure 501 contained the highest concentration of points (i.e. more than five points at each elemental area), so the frequencies of occurrence within this region are omitted for clarity of illustration. The position on the GR axis designated as $GR_{wf}$ is indicated by the line of lowest gamma ray readings on the plot, as shown in dashed line. The position on the GR axis designated as $GR_{wb}$ is indicated by the GR value at which increasing GR no longer results in increasing values of $1/\sigma_{wa}'$. This means that at $GR_{wb}$ essentially all the water in the formations is bound (typically by whatever shaliness in present). Any further shaliness or increases in the volume of clay would mean an increase in GR toward $GR_{max}$ (FIG. 5), but would not increase the bound water fraction since essentially all water present was indicated as bound at the $GR_{wb}$ line. The fraction of bound water is then determined by interpolation between the reference lines $GR_{wf}$ and $GR_{wb}$, that is, as $$S_{wb} = \frac{GR - GR_{wf}}{GR_{wb} - GR_{wf}} \tag{16}$$

The line on the $1/\sigma_{wa}'$ axis at which $1/\sigma_{wa}'$ no longer varies substantially with GR (beyond $GR_{wb}$) is indicative of $1/\sigma_{wb}$, since, as previously noted, at this point on the plot essentially all of the formation water is bound. Accordingly $\sigma_{wb}$ is derived from the dashed line labelled with this designation. Applicant has found that $\sigma_{wb}$ is substantially a constant and has a value of about 7 mhos/m at 75° C. It is not, however, considered a universal constant and may vary somewhat in different regions. In any event, it is determinable from e.g. the cross-plot of FIG. 5. The value of the free water conductivity $\sigma_{wf}$, can be obtained, for example, from the free water dashed line on the FIG. 5 plot. Alternatively, as is known in the art, $\sigma_{wf}$ can be obtained from a clean sand section of a resistivity log or from local knowledge. It will be understood that alternate techniques can be utilized to obtain at least some of the values considered herein.

With values of $GR_{wf}$, $GR_{wb}$, $\sigma_{wf}$, and $\sigma_{wb}$ having been established for the depth range of interest, corresponding signal levels can be input to the computing module 60 (FIG. 2). Now, log values of GR (as a function of depth can be input to module 60 and $\sigma_{wco}'$ can be output and recorded (if desired) on a dynamic basis. At the same time, the computing module 70 (FIG. 3) generates $\sigma_o'$ as an output to recorder 90. This signal can now be overlayed with $\sigma_t$, to great advantage in identifying potential hydrocarbon bearing zones.

Figure 6:
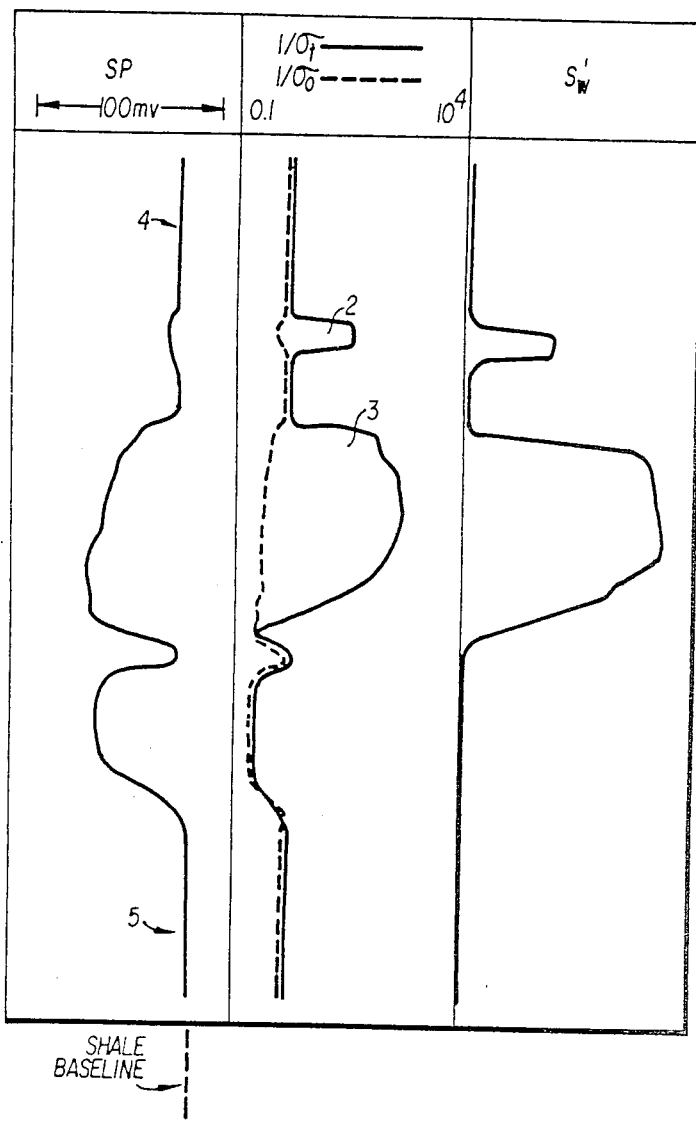
FIG. 6 is a log of values, including computed values, versus depth which illustrates how the invention can be utilized.

FIG. 6 illustrates the nature of the signals which can be recorded by the recorder 90 in the embodiment of FIG. 1. The vertical axis represents depth. The middle track shows the inverses of $\sigma_o'$ (dashed line) and $\sigma_t$ (solid line); i.e., the computed "wet" resistivity and the measured deep resistivity, respectively. The regions of divergence of these curves, for example the regions designated 2 and 3, indicate that the measured deep resistivity is substantially greater than the computed "wet" resistivity (or, conversely, that the measured deep conductivity is substantially less than the computed "wet" conductivity), thereby indicating that they are potential hydrocarbon bearing zones. The left hand track illustrates the output of a spontaneous potential (SP) log over the same depth range. Relatively stable values of the SP, for example in the regions designated 4 and 5 are at the "shale baseline" and characteristic of shaly regions. It is seen that the resistivity curves generally track each other even in the shaly zones, as should be the case for water-bearing shale regions. This continuous tracking of the measured and derived resistivity signals is an important advantage of the present invention since comparable prior art techniques are generally unreliable in shaly regions, as discussed in the Background section hereof.

The determination of a computed value of water saturation, $S_w'$, will now be considered. Relation (9) above indicated that the composite water conductivity, $\sigma_{wc}$, is expressed as:

$$\sigma_{wc} = \sigma_{wf} + \frac{S_{wb}}{S_w}(\sigma_{wb} - \sigma_{wf}) \tag{9}$$

From equation (6) we can write $$\sigma_t = \sigma_w S_w^2 \phi_t^2 \tag{17}$$

where $\sigma_w$ is the (unknown) actual conductivity of the formation water. Substituting the expression for composite water conductivity ($\sigma_{wc}$) for $\sigma_w$ in (17) gives:

$$\begin{aligned}\sigma_t &= \sigma_{wc} S_w^2 \phi_t^2 \\ &= \phi_t^2 S_w^2 [\sigma_{wf} + \frac{S_{wb}}{S_w}(\sigma_{wb} - \sigma_{wf})] \\ &= \phi_t^2 S_w^2 \sigma_{wf} + \phi_t^2 S_w S_{wb}(\sigma_{wb} - \sigma_{wf})\end{aligned} \tag{18}$$

The apparent water conductivity $\sigma_{wa}'$ (as described in conjunction with FIG. 5) is equal to $\sigma_t/\phi_t^2$. Substituting into (18) gives $$\sigma_{wa}' = S_w^2 \sigma_{wf} + S_w S_{wb}(\sigma_{wb} - \sigma_{wf}) \tag{19}$$

which can be rewritten as:

$$[\sigma_{wf}]S_w^2 + [S_{wb}(\sigma_{wb} - \sigma_{wf})]S_w - \sigma_{wa}' = 0 \tag{20}$$

This quadradic equation can be solved for $S_w$ to obtain:

$$S_w = \frac{\sqrt{[S_{wb}(\sigma_{wb} - \sigma_{wf})]^2 + 4\sigma_{wf}\sigma_{wa}'} - S_{wb}(\sigma_{wb} - \sigma_{wf})}{2\sigma_{wf}} \tag{21}$$

From relationship (21) it is seen that a value of water saturation, obtained using the composite (free and bound) water technique of the present invention, can provide meaningful information even in shaly regions, since the effects of the shales in binding a portion of the formation waters is accounted for in the relationship. Accordingly, the prior art technique of estimating an appropriate "cementation" exponent for shaly formations is obviated.

Figure 4:
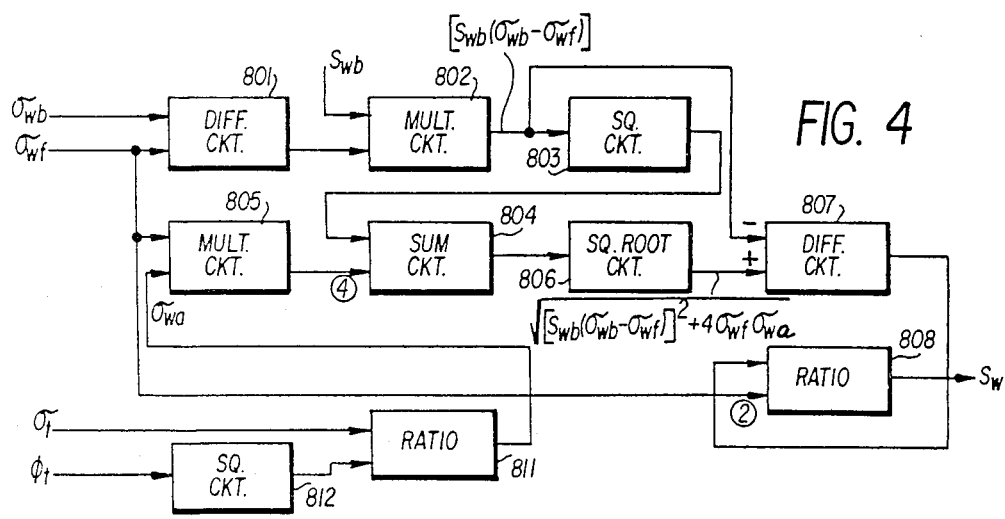
FIG. 4 is a block diagram of the computing module 80 of FIG. 1.

FIG. 4 illustrates an implementation of the computing module 80 utilized to generate a signal representative of computed water saturation, designated $S_w'$, in accordance with relationship (21). The signal representative of "true" or measured resistivity, $\sigma_t$(FIG. 1), is one input to a ratio circuit 811. The other input to ratio circuit is the output of a squaring circuit 812 whose input is a signal representative of $\phi_t$. Accordingly, the output of ratio circuit 811 is proportional to $\sigma_t/\phi_t^2$, which equals the apparent formation conductivity, $\sigma_{wa}'$. This signal is, in turn, coupled as one input to a multiplier circuit 805 whose other input is a signal representative of $\sigma_{wf}$. The output of multiplier 805 is coupled, with a weighting factor of 4, to one input of a summing circuit 804. The signal $\sigma_{wf}$ is also coupled to the negative input terminal of a difference circuit 801, the positive input terminal of which receives a signal representative of $\sigma_{wb}$. The output of difference circuit 801 is one input to a multiplier 802. The other input to multiplier 802 is a signal representative of $S_{wb}$, which may be derived, for example, from the output of the limiter 604 of FIG. 2. Accordingly, the output of multiplier 802 is a signal representative of $S_{wb}(\sigma_{wb}-\sigma_{wf})$. This signal is coupled to a squaring circuit 803 and to the negative input terminal of a difference circuit 807. The output of squaring circuit 803 is coupled to the other input terminal of summing circuit 804 whose output is, in turn, coupled to a square root circuit 806. The output of the square root circuit 806 is coupled to the positive input terminal of difference circuit 807. The output of difference circuit 807 is coupled to one input of a ratio circuit 808, the other input of which receives the signal representative of $\sigma_{wf}$, this signal being afforded a weighting factor of 2. The output of ratio circuit 808 is the desired signal representative of $S_w'$, in accordance with relationship (21). The right track of FIG. 6 illustrates the recorded values of the computed water saturation, $S_w'$.

The determination of a composite conductivity and determination of water saturation, in accordance with the principles of the invention, applies equally well in the invaded zone of the formations. In the relationships (9) and (18) for example, the quantity $\sigma_{wf}$ would be replaced by $\sigma_{mf}$ (i.e. the conductivity of the invading mud filtrate) and the water saturation $S_w$ would be replaced by the invaded zone saturation $S_{xo}$. The EMP logging device referred to above measures characteristics of the invaded zone. In the abovereferenced U.S. Patent application Ser. No. 788,393, a technique is disclosed for measuring $\phi_{wb}$ using an EMP logging device. This technique can be utilized as an alternate herein for obtaining $S_{wb}$ from $S_{wb}=\sigma_{wb}/\sigma_t$. In another aboveferenced U.S. Patent application Ser. No. 806,983 it is disclosed that conductivity as measured using an EMP device, and designated $\sigma_{EMP}$, is related to the conductivity of the formation water, $\sigma_w$, as a linear function of water-filled porosity, $\phi_w$, i.e.:

$$\sigma_{EMP} = \sigma_w \phi_w \quad (22)$$

Since $S_w = \phi_w/\phi_t$ and $\phi_w = \phi_t S_w$, relationship (22) can be expressed as:

$$\sigma_{EMP} = \phi_t S_w \sigma_w \quad (23)$$

Substituting the expression (9) composite water conductivity for $\sigma_w$ into (23) gives:

$$\sigma_{EMP} = \phi_t S_w [\sigma_{wf} + \frac{S_{wb}}{S_w}(\sigma_{wb} - \sigma_{wf})] \quad (24)$$
$$= \phi_t S_w \sigma_{wf} + \phi_t S_{wb}(\sigma_{wb} - \sigma_{wf})$$

Substituting $\sigma_{mf}$ for $\sigma_{wf}$ and $S_{xo}'$ for $S_w$ and solving for $S_{xo}'$ yields $$S_{xo}' = \frac{\sigma_{EMP}/\phi_t - S_{wb}(\sigma_{wb} - \sigma_{mf})}{\sigma_{mf}} \quad (25)$$

Figure 10:
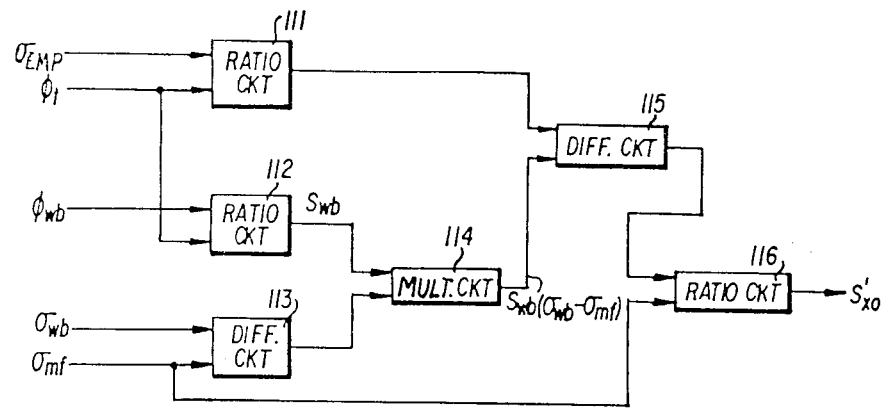
FIG. 10 is a block diagram of a circuit useful in obtaining values of the invaded zone water saturation.

Referring to FIG. 10, there is shown a block diagram of a computing module 80' suitable for obtaining a signal which represents the computed invaded zone water saturation, $S_{xo}'$, in accordance with relationship (25). A ratio circuit 111 receives as one input a signal representative of $\sigma_{EMP}$, and as its other input a signal representative of $\phi_t$. The signal $\sigma_{EMP}$ may be derived from the EMP device 46 (FIG. 1) by using processing circuitry 51 as disclosed, for example, in the above referenced copending U.S. Patent application Ser. No. 806,983. Another ratio circuit 112 receives as one input a signal representative of $\phi_{wb}$, and as its other input the signal representative of total porosity, $\phi_t$. As noted just above, $\phi_{wb}$ can be derived from the measurements taken with an EMP logging device and, in this example, is utilized, in conjunction with $\phi_t$, to obtain $S_{wb}$ (the output of ratio circuit 112). It will be understood, however, that $S_{wb}$ can be obtained using alternate techniques, such as those described herein. A difference circuit 113 receives as its input the signals representative of $\sigma_{wb}$ (which may be obtained as indicated above and is typically, although not necessarily, about 7 mhos/m at 75° C.) and $\sigma_{mf}$. The outputs of ratio circuit 112 and difference circuit 113 are coupled to a multiplier circuit 114 whose output is therefore $S_{wb}(\sigma_{wb}-\sigma_{mf})$. The output of ratio circuit 111 and multiplier circuit 114 are coupled to still another difference circuit 115. The output of difference circuit 115 is therefore seen to represent the numerator in expression (25). This output, and the signal representative of $\sigma_{mf}$, are the inputs to another ratio circuit 116, whose output is seen to be representative of $S_{xo}'$, in accordance with expression (25). This signal can be recorded, in the manner of the illustration in FIG. 5.

The spontaneous potential measurements from SP device 45 (FIG. 1) can also be used, for example, as an alternate technique for obtaining values of $S_{wb}$. The SP measurement can be expressed as $$SP = K \log_{10} \frac{S_w \sigma_{wc}'}{S_{xo} \sigma_{mf}'} \quad (26)$$

where K is a constant dependent upon absolute temperature and $\sigma_{mf}'$ is a composite conductivity for the invaded zone mud filtrate, similar in form to $\sigma_{wc}'$ as expressed by relationship (9). Using relationship (9) as a basis, we have:

$$S_w \sigma_{wc}' = S_w \sigma_{wf} + S_{wb}(\sigma_{wb} - \sigma_{wf}) \quad (27)$$

and $$S_{xo} \sigma_{mf}' = S_{xo} \sigma_{mf} + S_{wb}(\sigma_{wb} - \sigma_{mf}) \quad (28)$$

Substituting (27) and (28) into (26) and rearranging gives:

$$S_{xo}10^{SP/K} - \frac{S_w \sigma_{wf}}{\sigma_{mf}} = S_b \frac{\sigma_{wb}}{\sigma_{mf}} (1 - 10^{SP/K}) + 10^{SP/K} - \frac{\sigma_{wf}}{\sigma_{mf}} \quad (29)$$

In a water-bearing region of the formations where $S_{xo}=S_w$ relationship (29) reduces to:

$$S_{wb} = \frac{1}{1+\nu}$$
$$\text{where } \nu = \frac{\sigma_{wb}/\sigma_{mf}(1 - 10^{SP/K})}{10^{SP/K} - \sigma_{wf}/\sigma_{mf}} \quad (30)$$

Figure 11:
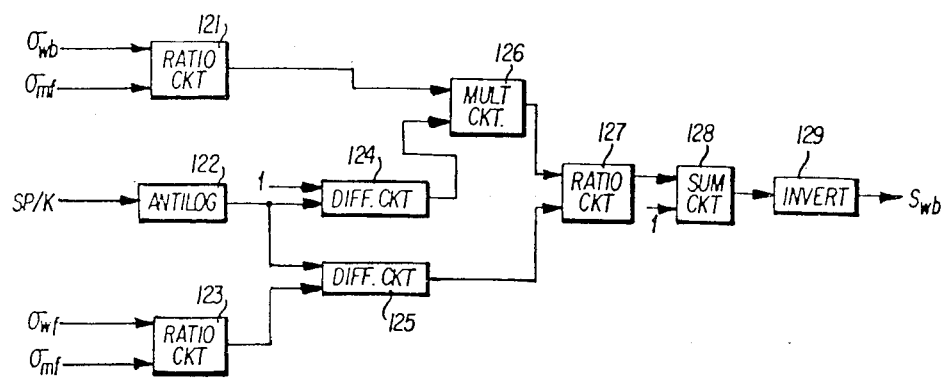
FIG. 11 is a block diagram of a circuit useful in obtaining an alternate value of bound water saturation.

Therefore, the relationship (30) can be utilized (taking SP from a water-bearing region) as an alternate technique for obtaining $S_{wb}$. FIG. 11 illustrates circuitry that can be utilized to obtain a signal representative of $S_{wb}$ in accordance with relationship (30). The combination of ratio circuit 121, antilog circuit 122, difference circuit 124 and multiplier 126 are used to obtain the numerator, while ratio circuit 123, antilog circuit 122, and difference circuit 125 are used to obtain the denominator of $\nu$. The ratio circuit 127 then yields $\nu$ and summing circuit 128 and inverter 129 are used to obtain a signal representative of $S_{wb}$.

In the previously described embodiments, the determined composite parameter of the formations has been the composite conductivity (or resistivity). Another composite parameter which can be determined is the composite capture cross section, as obtained using an NDT log plus inputs corresponding to those indicated above. As is well known, the NDT is particularly useful in cased holes where resistivity logs cannot be used. In such case, the relationship (11) as set forth above is:

$$\Sigma'_{wc} = \Sigma_{wf} + \frac{S_{wb}}{S_w} (\Sigma_{wb} - \Sigma_{wf}) \quad (11)$$

Figure 7:
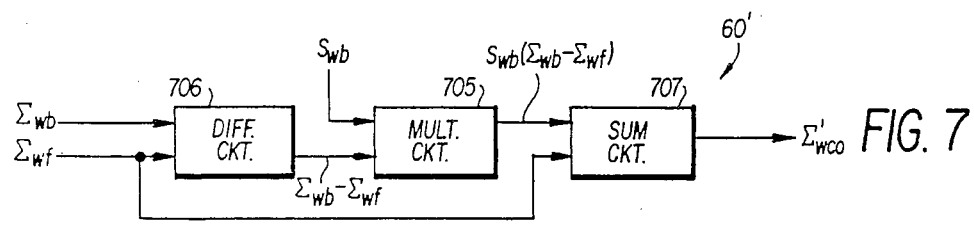
FIG. 7 is a block diagram of circuitry useful in obtaining a signal representative of apparent composite capture cross section of subsurface formations.
Figure 8:
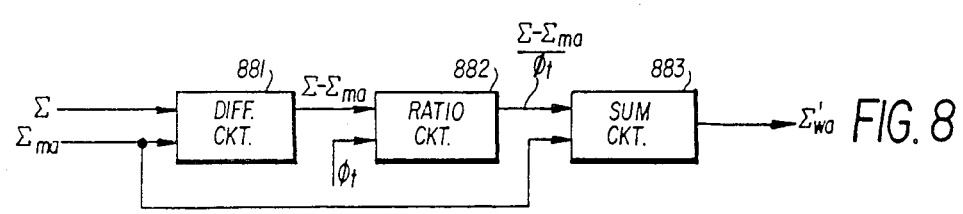
FIG. 8 is a block diagram of a circuit useful in obtaining values of apparent water capture cross section of subsurface formations.

An apparent composite capture cross section, designated $\Sigma_{wco}'$, can be obtained in the same manner that $\sigma_{wco}'$ was developed above, and by using the computing module 60' illustrated in FIG. 7. In FIG. 7, the multiplier 705, difference circuit 706, and summing circuit 707 operate in the same fashion as the corresponding units 605, 606 and 607 of FIG. 2. Suitable values of $\Sigma_{wf}$, $\Sigma_{wb}$ and $S_{wb}$ can be obtained by cross-plotting $\Sigma$ against GR in the manner described in conjunction with FIG. 5. The only difference is that instead of using relationship (15) to obtain a computed apparent water conductivity, an apparent water capture cross section, $\Sigma_{wa}'$, to be plotted against GR, is obtained from the known relationship $$\Sigma'_{wa} = \frac{\Sigma - \Sigma_{ma}}{\phi_t} + \Sigma_{ma} \quad (31)$$

where $\Sigma_{ma}$ is the matrix capture cross section for the particular lithology encountered. The circuitry of FIG. 8, including difference circuit 881, ratio circuit 882 and summing circuit 883, can be employed to obtain $\Sigma_{wa}'$ in accordance with relationship (31). After plotting $\Sigma_{wa}'$ against GR, $\Sigma_{wf}$ and $\Sigma_{wb}$ can be determined, for example, as indicated in conjunction with FIG. 5. $S_{wb}$ can be obtained using the arrangement of circuits 601, 602, 603, 604, of FIG. 2, as described in conjunction therewith. Having determined $\Sigma_{wco}'$, one can now compute a "wet" capture cross section (analagous to $\sigma_o'$ obtained using relationship (14) above) from:

$$\Sigma_o' = \phi_t \Sigma_{wco}' + (1-\phi_t)\Sigma_{ma} \quad (32)$$

Figure 9:
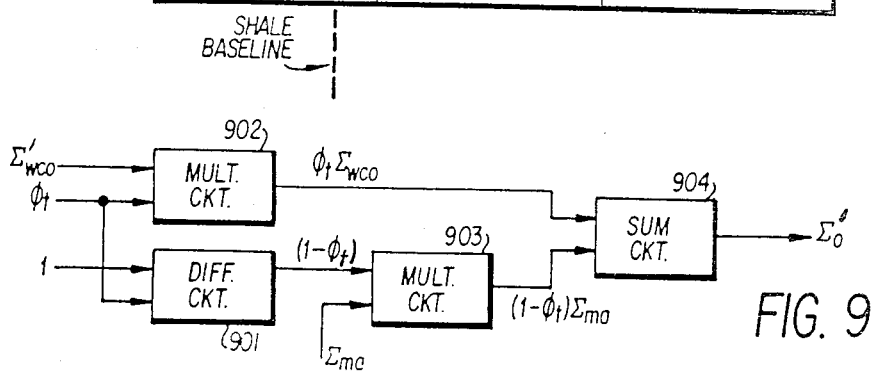
FIG. 9 is a block diagram of a circuit useful in obtaining signals representative of a "wet" capture cross section that can be compared to measured values of capture cross section.

The circuitry of FIG. 9, including difference circuit 901, multipliers 902 and 903, and summing circuit 904, can be utilized to generate a signal representative of $\Sigma_o'$. This signal can then be overlayed with the measured log value, $\Sigma$, in the manner illustrated in the central rack of FIG. 5, to reveal potential hydrocarbon bearing zones.

A further composite parameter which can be expressed by the generalized relationship (9a) is attenuation, $\alpha$, i.e. the relative attenuation (typically corrected for temperature and spreading loss) measured by the microwave electromagnetic propagation tool ("EMP"-46 of FIG. 1). The relationship for this parameter is set forth above (9b), and will be considered momentarily. First, and consistent with the teachings of my U.S. Pat. No. 4,092,583, consider that the measured attenuation of the bulk formation (designated $\alpha$) can be expressed as $$\alpha = \phi_w \alpha_{wc} + (1-\phi_w)\alpha_m \quad (33)$$

where $\alpha_{wc}$ is the attenuation attributable to the formation water (i.e., its composite water, in accordance with the teachings hereof) and $\alpha_m$ is the attenuation attributable to the formation matrix. Since $\alpha_m$ is very small compared to $\alpha_w$, one can write $$\alpha = \phi_w \alpha_{wc} \quad (34)$$

This relationship expresses that the bulk formation attenuation is volumetrically "adjusted" by a factor $\phi_w$ to take account of the fact that loss is essentially only occurring in that fraction of the bulk formation occupied by the water. Returning, now, to relationship (9b), we have $$\alpha_{wc} = \alpha_{wf} + \frac{S_{wb}}{S_w} (\alpha_{wb} - \alpha_{wf}) \quad (9b)$$

where $\alpha_{wf}$ is the attenuation attributable to the free water (i.e. the attenuation which one would measure with the "EMP" logging device in a theoretical environment consisting exclusively of the formation free water), $\alpha_{wb}$ is the attenuation attributable to the bound water (i.e. the attenuation which one would measure with the "EMP" logging device in a theoretical environment consisting exclusively of the formation bound water), and $\alpha_{wc}$ is the attenuation attributable to the composite water (i.e. the attenuation which one would measure with a "EMP" logging device in a theoretical environment consisting exclusively of the actual formation water).

Solving relationship (9b) for the bound water fraction, $S_{wb}/S_w$, yields the relationship (9c) first set forth above:

$$\frac{S_{wb}}{S_w} = \frac{\alpha_{wc} - \alpha_{wf}}{\alpha_{wb} - \alpha_{wf}} \quad (9c)$$

In the form of the present invention, $\alpha_{wf}$ and $\alpha_{wb}$ (or these parameters multiplied by water filled porosity, $\phi_w$, to obtain "bulk" variables $\phi_{\alpha_{wf}}$ and $\phi_{\alpha_{wb}}$) are determined using attenuation and travel time (or velocity) measurements taken with an electromagnetic propagation logging device such as "EMP" 46 of FIG. 1. The conductivity (generally of the formation invaded zone) obtained using the "EMP" device, designated $\sigma_{EMP}$, can be expressed as $$\sigma_{EMP} = \alpha t_{pl}/K \qquad (35)$$

where K is a constant, $t_{pl}$ is the measured travel time through the formations, and $\alpha$ is the bulk attenuation determined from the measured attenuation corrected for spreading loss and temperature, $\alpha$ being $\phi_w \alpha_{wc}$ (relationship (34) above). While the relationship (35) for conductivity is expected to hold substantially independent of the salinity of the formation water, it has been observed that frequently $\sigma_{EMP}$ exceeds the conductivity measured from other tools. An explanation for the observed differences in conductivity is that not all of the losses represented by the bulk attenuation measurement $\alpha$ are due to the conductivity or salinity of the formation water. Extraordinary losses are believed to occur in the presence of bound water, these losses being more dielectric than conductive in nature. Applicant has discovered that treating bound water losses separate from the ordinary expected free water losses resolves the problem and produces more realistic values of $\sigma_{EMP}$. In accordance with a feature of the invention, and as will be described, an attenuation representative variable is determined that is, inter alia, more appropriate for use in obtaining $\sigma_{EMP}$. In the example below, this attenuation representative variable is the free water variable $\phi_w \alpha_{wf}$. The determined variable is also useful in conjunction with other techniques where attenuation is utilized as an input or a correction.

Figure 12:
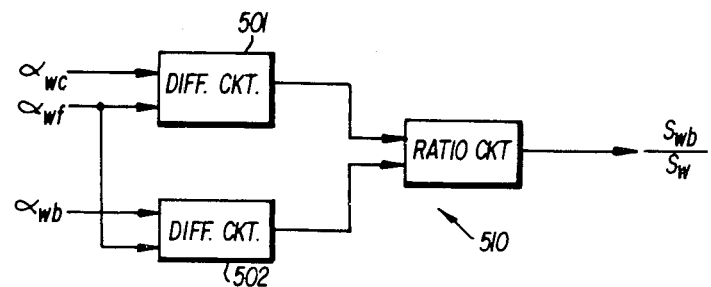
FIG. 12 is a block diagram of a circuit useful in obtaining a signal representative of the bound water fraction.

Referring to FIG. 12, there is shown implementation of the computing module 510 of FIG. 1 which is utilized to generate a signal representative of the bound water fraction, $S_{wb}/S_w$. A pair of difference circuits 501 and 502 are provided. The positive input terminal of circuit 501 receives a signal representative of the quantity $\alpha_{wc}$ and the negative input terminal of circuit 501 receives a signal representative of the quantity $\alpha_{wf}$. The positive input terminal of circuit 502 receives a signal representative of the quantity $\alpha_{wb}$, and the negative input terminal of circuit 502 receives the signal representative of the quantity $\alpha_{wf}$. The outputs of difference circuits 501 and 502 are respectively coupled to a ratio circuit 503 which produces a signal proportional to the ratio of the output of circuit 501 divided by the output of circuit 502. The output of ratio circuit 503 is accordingly a signal representative of the bound water fraction, $S_{wb}/S_w$, in accordance with relationship (9c). In actuality, and as will be clarified shortly, the inputs to computing module 510 may each have a common multiplier, $\phi_w$.

The manner in which the inputs to computing module 510 can be developed will now be described. In particular, one preferred technique for deriving values of $\alpha_{wf}$ and $\alpha_{wb}$ (or, of related bulk attenuation variables $\phi_w \alpha_{wf}$ and $\phi_w \alpha_{wb}$) is as follows: Log values of $\alpha$ (attenuation) and $t_{pl}$ (travel time) are initially obtained over a range of depth levels of interest (e.g., using EMP device 46 of FIG. 1—these outputs being indicated as being available from processing circuitry 51). The obtained values of $\alpha$ and $t_{pl}$ are cross plotted, as shown in the frequency cross plot of FIG. 13. The values of $\alpha$ may first be corrected for temperature and for spreading loss. The cross plot of FIG. 13 can be initially understood by recognizing that higher porosity generally results in higher values of both attenuation and travel time (at least, when that porosity contains water). This is because the water is much lossier than the rock matrix (thus: greater attenuation) and the velocity of the electromagnetic energy through water is lower than through the matrix (thus: greater travel time). Accordingly, increasing values of $t_{pl}$ and $\alpha$ on the cross plot generally correspond to increasing values of porosity. It can be noted that $\alpha$ could alternatively be cross-plotted against other non-conductivity related measurements reflecting total porosity, $\phi_t$, such as $\phi_{ND}$, previously described.

The point designated $t_{pm}$ on the $t_{pl}$ axis represents the travel time through the formation matrix. Two trend lines, designated as the "free water trend line" and the "bound water trend line" are constructed by starting at the point $t_{pm}$ and drawing lines through the approximate bottom and top edges of the main cluster of points on the cross plot. These trend lines can be understood in the following terms: In those portions of the formations containing substantially only free water, both $t_{pl}$ and $\alpha$ will increase with porosity, with the increase in travel time being dependent upon the volume of water and the increase in attenuation being dependent upon both the volume of water and its conductivity. Accordingly, the slope of the free water trend line will depend upon the conductivity or lossiness associated with the free water. The same will generally be true of those portions of the formations in which substantially all of the water is bound water. However, in this case, attenuation will be a function of not only the volume of water and its conductivity, but also of the generally higher losses, included dipolar losses, associated with the bound water. Accordingly, the bound water trend line usually has substantially greater slope than the free water trend line. It will be understood that these trends representing the relationships between attenuation and travel time in a substantially free water region (such as a clean sand) and a bound water region (such as a shale) could be determined initially from logs taken in such formation regions. Also, it will be understood that these relationships are determinable functions which need not necessarily be linear, but are illustrated as being linear in the graph of FIG. 13.

Figure 13:
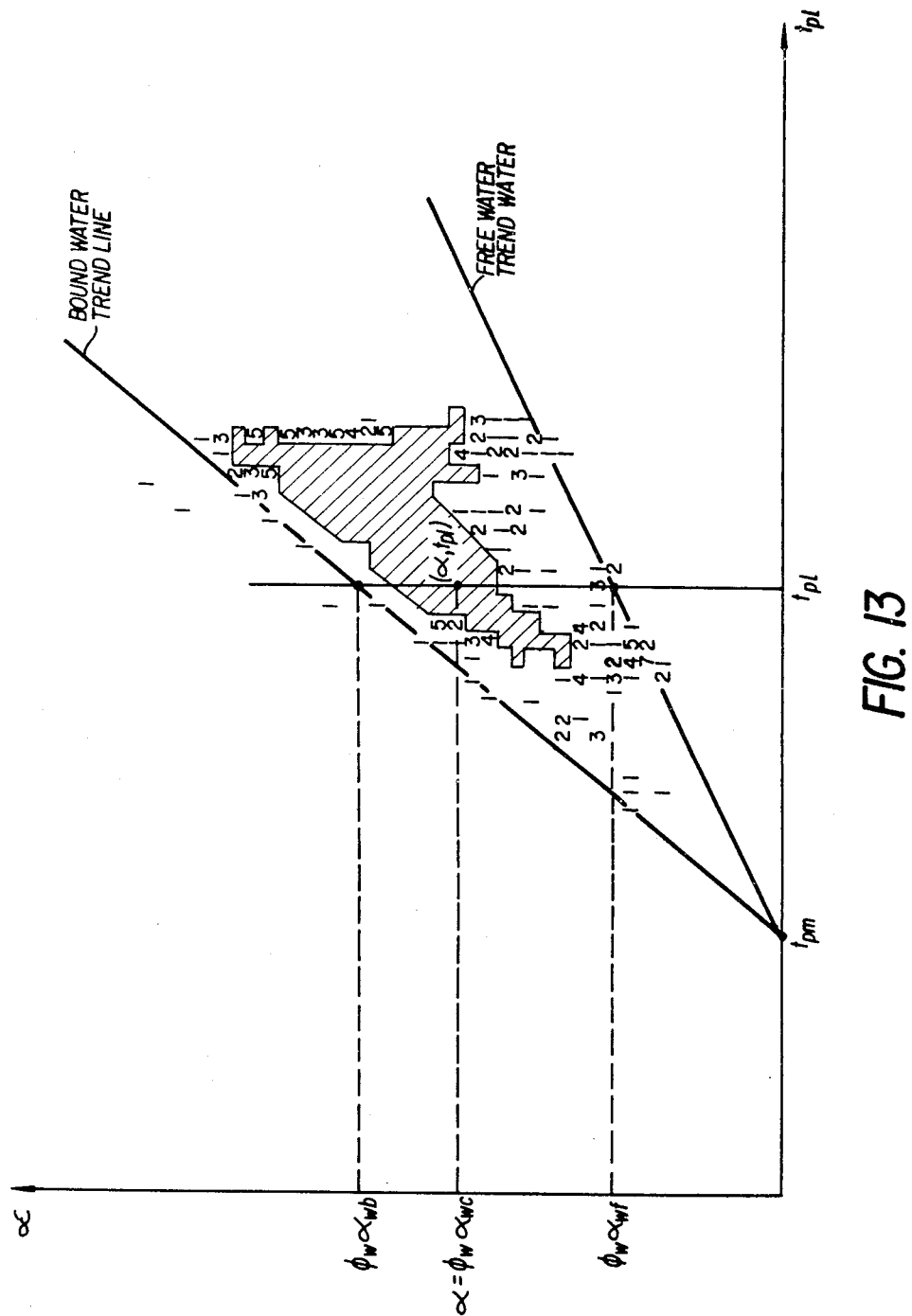
FIG. 13 is a frequency cross-plot useful in obtaining subsurface characteristic values that can be utilized in the present invention.

Having established free water and bound water trend lines (or functions), one can now, at each depth level of interest, obtain a free water attenuation quantity representative of the attenuation attributable to the formations (surrounding the depth level of interest) as if substantially all of the water in the formations was free water. Similarly, one can derive a bound water attenuation quantity representative of the attenuation attributable to said formations (surrounding the depth level of interest) as if substantially all of the water in the formations was bound water. Using these quantities, in conjunction with the measured attenuation at the depth level of interest, one can then determine the bound water fraction in the formations surrounding the particular depth level. With reference to FIG. 13, consider the illustrated individual point $(\alpha, t_{pl})$ and the vertical line drawn therethrough. At the particular measured value of $t_{pl}$, the intersection with free water trend line indicates the attenuation value that one would have measured if the water in the pore spaces of this particular formation contained exclusively free water (i.e., $\phi_w \alpha_{wf}$) whereas the intersection with the bound water trend line indicates the attenuation that would have been measured if the pore spaces of this formation contained exclusively bound water (i.e., $\phi_w \alpha_{wb}$). In actuality, the measured attenuation ($\alpha = \phi_w \alpha_{wc}$) is an attenuation which has a value between these two extreme values, and the total water in the pore spaces can be considered as a composite water having attenuation $\alpha_{wc}$. Accordingly, it is seen that relationship (9c) and the output of computing module 510 represents a linear apportionment between the two extreme values and yields the bound water fraction, $S_{wb}/S_w$. (Note that the multiplier $\phi_w$ before each term will be cancelled in the output of computing module 510 if $\phi_w \alpha_{wc}$, $\phi_w \alpha_{wf}$ and $\phi_w \alpha_{wb}$ are used as the input quantities.)

In addition to the use of $\phi_w \alpha_{wf}$ and $\phi_w \alpha_{wb}$ in obtaining the bound water fraction, the bulk formation attenuation if all the water was free water (i.e., $\phi_w \alpha_{wf}$) is useful, as first noted above, in determining $\sigma_{EMP}$, since attenuation due to whatever bound water is present will not then result in an unduly high value of $\sigma_{EMP}$. In particular, $\sigma_{EMP}$ can be determined from $$\sigma_{EMP} = \frac{\phi_w \alpha_{wf} t_{pl}}{K} \quad (36)$$

which is a modified form of relationship (35) wherein the bulk free water attenuation ($\phi_w \alpha_{wf}$) is substituted for the bulk composite water attenuation ($\phi_w \alpha_{wc}$ which is the equivalent of the measured $\alpha$ in accordance with (34) above).

Figure 14:
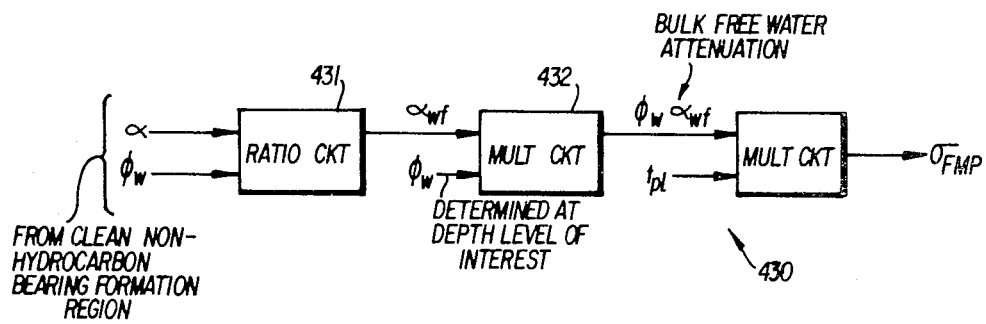
FIG. 14 is a block diagram of a circuit for obtaining signals representative of free water attenuation, bulk free water attenuation, and EMP-derived conductivity.

An alternative technique for obtaining the bulk free water attenuation, $\phi_w \alpha_{wf}$, is to use the apparatus of FIG. 14. A ratio circuit 431 receives at its inputs signals representative of $\alpha$ and $\phi_w$, both as determined from measurements taken with an EMP device 46 (FIG. 1) in a clean non-hydrocarbon-bearing region of the formations in which substantially all of the water present is free water. (The signal representative of $\phi_w$ may be obtained, for example, using the technique of my U.S. Pat. No. 4,092,583.) The ratio $\alpha/\phi_w$, in this region, will be representative of $\alpha_{wf}$ in accordance with relationships (34) and (9b), where $S_{wb}=0$ for this case. In particular $$\alpha = \phi_w \alpha_{wc} = \phi_w \alpha_{wf} + \phi_w \frac{S_{wb}}{S_w}(\alpha_{wb} - \alpha_{wf}) \quad (37)$$

$$\alpha = \phi_w \alpha_{wf} \text{(when } S_{wb}=0\text{)} \quad (38)$$

so that $\alpha_{wf} = \alpha/\phi_w$ when $S_{wb}=0$. Having obtained the parameter $\alpha_{wf}$ for the formations, the variable $\phi_w \alpha_{wf}$ (i.e., the bulk free water attenuation) can now be determined at a particular depth level of interest by multiplying the output of ratio circuit 431 by a signal representative of $\phi_w$ at that depth level; this being implemented by multiplier circuit 432. A further multiplier circuit 433 can then be employed to obtain a signal representative of $\sigma_{EMP}$ in accordance with relationship (36). It will be understood that analagous circuitry could be used to obtain a corresponding bound water parameter, $\alpha_{wb}$, from information in a shaley region, and then the bulk bound water attenuation at specific depth levels of interest could be obtained using a multiplier circuit to produce a signal representative of $\phi_w \alpha_{wb}$. The signals representative of $\phi_w \alpha_{wf}$ and $\sigma_{EMP}$ can also be recorded, if desired, by recorder 90 of FIG. 1.

It can be noted, in the context of obtaining either the bound water or free water related values, that non-linear interpolation can be employed, if desired (e.g., in FIG. 13). Further, since $t_{pl}$ may be affected by residual hydrocarbons left in the formation near the borehole, the indicated attenuation corresponding to free or bound water conditions may be slightly inaccurate. However, since both $t_{pl}$ and $\alpha$ will decrease due to hydrocarbon effects, there is some compensation in the indicated bound or free water saturations. When $\alpha_{wf}$ or $\phi_w \alpha_{wf}$ is determined, the hydrocarbon effects will lower corresponding $t_{pl}$ values and will produce slightly lower $\alpha_{wf}$ values and hence, when applied in conductivity measurements, lower $\sigma_{EMP}$ values. Use of a $\phi_t$ measurement (relatively independent of hydrocarbon effects) in place of $t_{pl}$, in the technique illustrated in FIG. 13, may be advisable in some instances.

The invention has been described with reference to particular embodiments, but variations within the spirit and scope of the invention will occur to those skilled in the art. For example, while circuitry has been described for generating analog signals representative of the desired quantities, it will be understood that a general purpose digital computer could readily be programmed to implement the techniques as set forth herein. Also, while conductivity values have been utilized for purposes of illustration, it will be recognized that the inverses of values utilized herein could be employed in conjunction with the inverse of conductivity; i.e., resistivity.

I claim:

1. Apparatus for determining a composite parameter of the formation water in formations surrounding a borehole, comprising:
   means for deriving a first quantity representative of said parameter attributable to the free water in said formations;
   means for deriving a second quantity representative of the fraction of bound water in said formations;
   means for deriving a third quantity representative of said parameter attributable to the bound water in said formations; and
   means for determining said composite parameter as a function of said first, second, and third quantities.

2. Apparatus as defined by claim 1 further comprising means for deriving a fourth quantity representative of the difference between said third and first quantities.

3. Apparatus as defined by claim 2 wherein said parameter is determined as the sum of said first quantity and the product of said second and fourth quantities.

4. Apparatus as defined by claim 1 wherein the parameter is the capture cross section.

5. Apparatus as defined by claim 2 wherein the parameter is the capture cross section.

6. Apparatus as defined by claim 3 wherein the parameter is the capture cross section.

7. Apparatus for determining the composite conductivity of the formation water in formations surrounding a borehole, comprising:
   means for deriving a first quantity representative of the conductivity of the free water in said formations;
   means for deriving a second quantity representative of the fraction of bound water in said formations;
   means for deriving a third quantity representative of the conductivity of the bound water in said formations; and
   means for determining said composite water conductivity as a function of said first, second and third quantities.

8. Apparatus as defined by claim 7 further comprising means for deriving a fourth quantity representative of the difference between said third and first quantities.

9. Apparatus as defined by claim 8 wherein said composite water conductivity is determined as the sum of said first quantity and the product of said second and fourth quantities.

10. Apparatus as defined by claim 7 further comprising means for deriving a fifth quantity representative of the fraction of free water in said formations, and wherein said composite water conductivity is determined as the sum of first and second products, the first product being said fifth quantity times said first quantity and the second product being said second quantity times said third quantity.

11. Apparatus as defined by claim 7 wherein said composite conductivity, $\sigma_{wc}'$, is determined as $$\sigma_{wc}' = \sigma_{wf} + \frac{S_{wb}}{S_b}(\sigma_{wb} - \sigma_{wf})$$

where $\sigma_{wf}$ is the conductivity of the free water in said formations, $\sigma_{wb}$ is the conductivity of the bound water in said formations, $S_{wb}$ is the bound water saturation in said formations, and $S_w$ is the water saturation in said formations.

12. Apparatus as defined by claim 7 wherein said composite conductivity is an apparent composite water conductivity, $\sigma_{wco}'$, and is determined as $$\sigma_{wco}' = \sigma_{wf} + S_{wb}(\sigma_{wb} + \sigma_{wf})$$

where $\sigma_{wf}$ is the conductivity of the free water in said formations, $\sigma_{wb}$ is the conductivity of the bound water in said formations, and $S_{wb}$ is the bound water saturation in said formations.

13. Apparatus as defined by claim 12 further comprising means for determining a computed "wet" conductivity of said formations, $\sigma_o'$, as $$\sigma_0' = \sigma_{wco}' \phi_t^2$$

where $\phi_t$ is the total porosity of said formations.

14. Apparatus for determining the water saturation of formations surrounding a borehole, comprising:
means for deriving a first quantity representative of the conductivity of the free water in said formations;
means for deriving a second quantity representative of the fraction of bound water in said formations;
means for deriving a third quantity representative of the conductivity of the bound water in said formations;
means for deriving a quantity representative of the measured conductivity of the formations; and
means for determining the water saturation of the formations as a function of said first, second and third quantities and said measured conductivity representative quantity.

15. Apparatus as defined by claim 14 further comprising means for deriving a quantity representative of the porosity of said formations, and wherein said water saturation determination is also a function of said porosity representative quantity.

16. Apparatus as defined by claim 15 wherein said means for determining water saturation comprises means responsive to said measured conductivity representative quantity and said porosity representative quantity for deriving a quantity representative of the apparent water conductivity of said formations, the water saturation determination then being a function of said first, second, and third quantities and said apparent water conductivity representative quantity.

17. Apparatus as defined by claim 16 wherein said water saturation is determined as $$S_w = \frac{\sqrt{[S_{wb}(\sigma_{wb} - \sigma_{wf})]^2 + 4\sigma_{wf}\sigma_{wa}'} - S_{wb}(\sigma_{wb} - \sigma_{wf})}{2\sigma_{wf}}$$

where $\sigma_{wf}$ is the conductivity of the free water in said formations, $\sigma_{wb}$ is the conductivity of the bound water in said formations, $S_{wb}$ is the bound water saturation in said formations, and $\sigma_{wa}'$ is the apparent water conductivity of said formations.

18. Apparatus as defined by claim 14 wherein the determined water saturation is the water saturation of the invaded zone of said formations.

19. Apparatus as defined by claim 18 wherein said first quantity is representative of the conductivity of the mud filtrate in the invaded zone of said formations.

20. Apparatus as defined by claim 19 wherein said quantity representative of measured conductivity is a conductivity as derived from a microwave electromagnetic propagation logging device.

21. Apparatus as defined by claim 20 wherein said saturation of the invaded zone of said formation, $S_{xo}'$, is determined as $$S_{xo}' = \frac{\sigma_{EMP}/\phi_t - S_{wb}(\sigma_{wb} - \sigma_{mf})}{\sigma_{mf}}$$

where $\sigma_{mf}$ is the conductivity of the mud filtrate invading said formations, $\sigma_{wb}$ is the conductivity of the bound water in said formations, $S_{wb}$ is the bound water saturation in said formations, $\phi_t$ is the total porosity of said formations, and $\sigma_{EMP}$ is the conductivity of the invaded formation as determined by an microwave electromagnetic propagation logging device.

22. A method for determining a composite parameter of the formation water in formations surrounding a borehole, comprising the steps of:
deriving a first quantity representative of said parameter attributable to the free water in said formations;
deriving a second quantity representative of the fraction of bound water in said formations;
deriving a third quantity representative of said parameter attributable to the bound water in said formations; and
determining said composite parameter as a function of said first, second, and third quantities.

23. The method as defined by claim 22 further comprising the step of deriving a fourth quantity representative of the difference between said third and first quantities.

24. The method as defined by claim 23 wherein said parameter is determined as the sum of said first quantity and the product of said second and fourth quantities.

25. The method as defined by claim 22 wherein the parameter is the capture cross section.

26. The method as defined by claim 23 wherein the parameter is the capture cross section.

27. Apparatus as defined by claim 24 wherein the parameter is the capture cross section.

28. A method for determining the composite conductivity of the formation water in formations surrounding a borehole, comprising the steps of:
 deriving a first quantity representative of the conductivity of the free water in said formations;
 deriving a second quantity representative of the fraction of bound water in said formations;
 deriving a third quantity representative of the conductivity of the bound water in said formations; and
 determining said composite water conductivity as a function of said first, second and third quantities.

29. The method as defined by claim 28 further comprising the step of deriving a fourth quantity representative of the difference between said third and first quantities.

30. The method as defined by claim 29 wherein said composite water conductivity is determined as the sum of said first quantity and the product of said second and fourth quantities.

31. The method as defined by claim 28 further comprising means for deriving a fifth quantity representative of the fraction of free water in said formations, and wherein said composite water conductivity is determined as the sum of first and second products, the first product being said fifth quantity times said first quantity and the second product being said second quantity times said third quantity.

32. The method as defined by claim 28 wherein said composite conductivity, $\sigma_{wc}'$, is determined as $$\sigma_{wc}' = \sigma_{wf} + \frac{S_{wb}}{S_b}(\sigma_{wb} - \sigma_{wf})$$

where $\sigma_{wf}$ is the conductivity of the free water in said formations, $\sigma_{wb}$ is the conductivity of the bound water in said formations, $S_{wb}$ is the bound water saturation in said formations, and $S_w$ is the water saturation in said formations.

33. The method as defined by claim 28 wherein said composite conductivity is an apparent composite water conductivity, $\sigma_{wco}'$, and is determined as $$\sigma_{wco}' = \sigma_{wf} + S_{wb}(\sigma_{wb} + \sigma_{wf})$$

where $\sigma_{wf}$ is the conductivity of the free water in said formations, $\sigma_{wb}$ is the conductivity of the bound water in said formations, and $S_{wb}$ is the bound water saturation in said formations.

34. The method as defined by claim 33 further comprising the step of determining a computed "wet" conductivity of said formations, $\sigma_o'$, as $$\sigma_o' = \sigma_{wco}' \phi_t^2$$

where $\phi_t$ is the total porosity of said formations.

35. A method for determining the water saturation of formations surrounding a borehole, comprising the steps of:
 deriving a first quantity representative of the conductivity of the free water in said formations;
 deriving a second quantity representative of the fraction of bound water in said formations;
 deriving a third quantity representative of the conductivity of the bound water in said formations;
 deriving a quantity representative of the measured conductivity of the formations; and
 determining the water saturation of the formations as a function of said first, second and third quantities and said measured conductivity representative quantity.

36. The method as defined by claim 35 further comprising the step of deriving a quantity representative of the porosity of said formations, and wherein said water saturation determination is also a function of said porosity representative quantity.

37. The method as defined by claim 36 wherein said step of determining water saturation comprises deriving a quantity representative of the apparent water conductivity of said formations in response to said measured conductivity representative quantity and said porosity representative quantity, the water saturation determination then being a function of said first, second, and third quantities and said apparent water conductivity representative quantity.

38. The method as defined by claim 37 wherein said water saturation is determined as $$S_w = \frac{\sqrt{[S_{wb}(\sigma_{wb} - \sigma_{wf})]^2 + 4\sigma_{wf}\sigma_{wa}'} - S_{wb}(\sigma_{wb} - \sigma_{wf})}{2\sigma_{wf}}$$

where $\sigma_{wf}$ is the conductivity of the free water in said formations, $\sigma_{wb}$ is the conductivity of the bound water in said formations, $S_{wb}$ is the bound water saturation in said formations, and $\sigma_{wa}'$ is the apparent water conductivity of said formations.

39. The method as defined by claim 35 wherein the determined water saturation is the water saturation of the invaded zone of said formations.

40. The method as defined by claim 39 wherein said first quantity is representative of the conductivity of the mud filtrate in the invaded zone of said formations.

41. The method as defined by claim 40 wherein said quantity representative of measured conductivity is a conductivity as derived from a microwave electromagnetic propagation logging device.

42. The method as defined by claim 41 wherein said saturation of the invaded zone of said formation, $S_{xo}'$, is determined as $$S_{xo}' = \frac{\sigma_{EMP}/\phi_t - S_{wb}(\sigma_{wb} - \sigma_{mf})}{\sigma_{mf}}$$

where $\sigma_{mf}$ is the conductivity of the mud filtrate invading said formations, $\sigma_{wb}$ is the conductivity of the bound water in said formations, $S_{wb}$ is the bound water saturation in said formations, $\phi_t$ is the total porosity of said formations, and $\sigma_{EMP}$ is the conductivity of the invaded formation as determined by an microwave electromagnetic propagation logging device.

43. Apparatus for determining a free water variable of formations surrounding a borehole, comprising:
 means for deriving a function representative of said variable in at least one region of said formations in which substantially all of the water present is free water;
 means for deriving a quantity representative of water content in said formations; and
 means for determining said free water variable from said function and said quantity.

44. Apparatus as defined by claim 43 wherein said quantity representative of water content is derived from at least one measurement taken in the formations surrounding a particular depth location in said borehole.

45. Apparatus as defined by claim 44 wherein said free water variable is the attenuation of electromagnetic energy attributable to the formations surrounding said particular depth location if substantially all of the water in said surrounding formations was free water, and wherein said function is derived from attenuation measurements.

46. Apparatus as defined by claim 45 wherein said quantity representative of water content is derived from at least one travel time measurement taken with a microwave electromagnetic propagation logging device.

47. Apparatus as defined by claim 45 wherein said attenuation measurements are measurements taken with a microwave electromagnetic propagation logging device.

48. A method for determining a free water variable of formations surrounding a borehole, comprising the steps of:
deriving a function representative of said variable in at least one region of said formations in which substantially all of the water present is free water;
deriving a quantity representative of water content in said formations; and
determining said free water variable from said function and said quantity.

49. The method as defined by claim 48 wherein said quantity representative of water content is derived from at least one measurement taken in the formations surrounding a particular depth location in said borehole.

50. The method as defined by claim 49 wherein said free water variable is the attenuation of electromagnetic energy attributable to the formations surrounding said particular depth location if substantially all of the water in said surrounding formations was free water, and wherein said function is derived from attenuation measurements.

51. The method as defined by claim 50 wherein said quantity representative of water content is derived from at least one travel time measurement taken with a microwave electromagnetic propagation logging device.

52. The method as defined by claim 50 wherein said attenuation measurements are measurements taken with a microwave electromagnetic propagation logging device.

53. Apparatus for determining the bound water fraction of formations surrounding a borehole, comprising:
means for deriving a first quantity representative of the attenuation of electromagnetic energy attributable to said formations if substantially all of the water in said formations was free water;
means for deriving a second quantity representative of the attenuation of electromagnetic energy attributable to said formations if substantially all of the water in said formations was bound water;
means for deriving a third quantity dependent upon the measured attenuation of electromagnetic energy by said formations; and
means for determining said bound water fraction from said first, second and third quantities.

54. Apparatus as defined by claim 53 wherein said third quantity depends on an attenuation measurement taken with a microwave electromagnetic propagation logging device.

55. Apparatus as defined by claim 54 wherein said bound water fraction is determined as the difference between said third and first quantities divided by the difference between said second and first quantities.

56. Apparatus as defined by claim 53 wherein said means for deriving said first quantity comprises:
means for deriving a first function representative of the attenuation attributable to at least one region of formations in which substantially all of the water present is free water;
means for deriving a quantity representative of water content; and
means for determining said first quantity from said first function and said water content representative quantity.

57. Apparatus as defined by claim 56 wherein said means for deriving said second quantity comprises:
means for deriving a second function representative of the attenuation attributable to at least one region of formations in which substantially all of the water present is bound water; and
means for determining said second quantity from said second function and said water content representative quantity.

58. A method for determining the bound water fraction of formations surrounding a borehole, comprising the steps of:
deriving a first quantity representative of the attenuation of electromagnetic energy attributable to said formations if substantially all of the water in said formations was free water;
deriving a second quantity representative of the attenuation of electromagnetic energy attributable to said formations if substantially all of the water in said formations was bound water;
deriving a third quantity dependent upon the measured attenuation of electromagnetic energy by said formations; and
determining said bound water fraction from said first, second and third quantities.

59. The method as defined by claim 58 wherein said third quantity depends on an attenuation measurement taken with a microwave electromagnetic propagation logging device.

60. The method as defined by claim 59 wherein said bound water fraction is determined as the difference between said third and first quantities divided by the difference between said second and first quantities.

61. The method as defined by claim 58 wherein said step of deriving said first quantity comprises:
deriving a first function representative of the attenuation attributable to at least one region of formations in which substantially all of the water present is free water;
deriving a quantity representative of water content; and
determining said first quantity from said first function and said water content representative quantity.

62. The method as defined by claim 61 wherein said step of deriving said second quantity comprises:
deriving a second function representative of the attenuation attributable to at least one region of formations in which substantially all of the water present is bound water; and
determining said second quantity from said second function and said water content representative quantity.

* * * * *

UNITED STATES PATENT AND TRADEMARK OFFICE
CERTIFICATE OF CORRECTION

PATENT NO. : 4,233,839            Page 1 of 2

DATED : November 18, 1980

INVENTOR(S) : George R. Coates

It is certified that error appears in the above-identified patent and that said Letters Patent are hereby corrected as shown below:

Col. 2, line 26, change equation (5) to --$F=a/\phi_t^m$--.

Col. 6, line 40, change "end" to --and--.

Col. 7, line 47, change "shown" to --known--.

Col. 10, line 64, change "$\sigma_t^2$" to --$\phi_t^2$--.

Col. 11, line 57, after "depth" insert --)--.

Col. 12, line 55, change equation (21) to $$--S_w = \frac{\sqrt{[S_{wb}(\sigma_{wb} - \sigma_{wf})]^2 + 4\sigma_{wf}\sigma_{wa}'} - S_{wb}(\sigma_{wb}-\sigma_{wf})}{2\sigma_{wf}}--.$$

Col. 13, line 5, change "resistivity" to --conductivity--.

Col. 16, line 10, change "rack" to --track--.

Col. 22, line 10, change the equation to

UNITED STATES PATENT AND TRADEMARK OFFICE
CERTIFICATE OF CORRECTION

PATENT NO. : 4,233,839
DATED : November 18, 1980
INVENTOR(S) : George R. Coates

It is certified that error appears in the above-identified patent and that said Letters Patent are hereby corrected as shown below:

$$-\!-\!S_w = \frac{\sqrt{[S_{wb}(\sigma_{wb} - \sigma_{wf})]^2 + 4\sigma_{wf}\sigma'_{wa}} - S_{wb}(\sigma_{wb} - \sigma_{wf})}{2\sigma_{wf}}$$

Col. 24, line 20, change the equation to $$-\!-\!S_w = \frac{\sqrt{[S_{wb}(\sigma_{wb} - \sigma_{wf})]^2 + 4\sigma_{wf}\sigma'_{wa}} - S_{wb}(\sigma_{wb} - \sigma_{wf})}{2\sigma_{wf}}$$

Signed and Sealed this

Thirtieth Day of June 1981

[SEAL]

Attest:

RENE D. TEGTMEYER

*Attesting Officer*   *Acting Commissioner of Patents and Trademarks*